US012696111B2

(12) United States Patent
Yao et al.

(10) Patent No.: US 12,696,111 B2
(45) Date of Patent: Jul. 28, 2026

(54) SENSING COUPLED EMERGENCY COMMUNICATION SERVICE QUALITY ASSURANCE METHOD

(71) Applicant: Xidian University, Xi'an (CN)

(72) Inventors: Zhuohui Yao, Xi'an (CN); Hao Chen, Xi'an (CN); Wenchi Cheng, Xi'an (CN); Tao Zhang, Xi'an (CN); Liping Liang, Xi'an (CN); Jingqing Wang, Xi'an (CN)

(73) Assignee: Xidian University, Xi'an (CN)

( * ) Notice: Subject to any disclaimer, the term of this patent is extended or adjusted under 35 U.S.C. 154(b) by 96 days.

(21) Appl. No.: 18/940,204

(22) Filed: Nov. 7, 2024

(65) Prior Publication Data

US 2026/0156490 A1    Jun. 4, 2026

(30) Foreign Application Priority Data

Oct. 8, 2024    (CN) .......................... 202411394972.3

(51) Int. Cl.
| | |
|---|---|
| *H04W 24/02* | (2009.01) |
| *H04B 17/309* | (2015.01) |
| *H04W 24/08* | (2009.01) |

(52) U.S. Cl.
CPC .......... *H04W 24/02* (2013.01); *H04B 17/346* (2023.05); *H04W 24/08* (2013.01)

(58) Field of Classification Search
CPC .............................. H04W 24/02; H04W 24/08
(Continued)

(56) References Cited

U.S. PATENT DOCUMENTS

2022/0225132 A1*    7/2022    Roy ................... H04B 7/18513

OTHER PUBLICATIONS

Behdad et al.,. (arXiv:2305.12523), Multi-Static Target Detection and Power Allocation for Integrated Sensing and Communication in Cell-Free Massive (MIMO), Mar. 2024, all (Year: 2024) (Year: 2024).*

(Continued)

*Primary Examiner* — Angel T Brockman
(74) *Attorney, Agent, or Firm* — Hemisphere Law, PLLC

(57) ABSTRACT

A sensing coupled emergency communication service quality assurance method includes: determining a communication latency index θ, which is taken as a communication QoS indicator, obtaining a user effective capacity C by calculating a user communication rate, calculating a detection probability $P_d$ and a false alarm rate $P_f$ according to radar echo signal energy detection results, fusing $P_d$ and $P_f$ into an effective capacity equation to obtain an expanded effective capacity, constructing an optimization problem by taking a total expanded effective capacity of the system as an objective function and taking the power, latency index and detection probability as constraints, and allocating the user power according to solution results of the optimization problem. The method can meet requirements of communication latency and detection probability of users at the same time, improve the aggregated effective capacity of the system, and can be used to guarantee multi-user communication and sensing services in post-disaster rescue scenarios.

8 Claims, 4 Drawing Sheets

(58) Field of Classification Search
USPC ......................................................... 370/252
See application file for complete search history.

(56) References Cited

OTHER PUBLICATIONS

UC Davis , Physics, Chapter 11: Detection of Signals in Noise , NF Figure, Oct. 20, 2010, all (Year: 2010) (Year: 2010).*
Negi et al. , Effective Capacity : A Wireless Link Model for Support of Quality of Service, IEEE, Jul. 2003 (Year: 2003) (Year: 2003).*
CNIPA, Notification of First Office Action for CN202411394972.3, Aug. 6, 2025.
Xidian University (Applicant), Replacement claims (allowed) of CN202411394972.3, Sep. 2, 2025.
CNIPA, Notification to grant patent right for invention in CN202411394972.3, Sep. 10, 2025.

* cited by examiner

SENSING COUPLED EMERGENCY COMMUNICATION SERVICE QUALITY ASSURANCE METHOD

CROSS-REFERENCE TO RELATED APPLICATION

This application claims priority to Chinese Patent Application No. 202411394972.3, filed on Oct. 8, 2024, which is herein incorporated by reference in its entirety.

TECHNICAL FIELD

The disclosure relates to the field of communication technologies, and more specifically, to an emergency communication service quality assurance method that can be used to ensure the quality of service for multi-user communication and sensing in post-disaster rescue scenarios.

BACKGROUND

After the occurrence of serious natural disasters, it is often faced with the "three-off" scene of "cut off the road, cut off the network, and cut off the power", and resources on site are severely limited and the electromagnetic environment is complex. Due to the scarce resources and rescue duration, it is challenging to satisfy the requirements of high-quality communications and sensing services at the same time. Additionally, the extremely complex environment also poses challenges to the carrying of equipment, which needs to meet the requirements of portability and miniaturization. Multi-standard rescue equipments are difficult to be interconnected and interoperated, and the communication efficiency is low due to mutual interference of stray waves, which will increase the risk of missing golden rescue time. Based on the above problems in the traditional emergency communication, it is necessary to apply a new technology that can achieve lower hardware complexity and higher resource utilization efficiency to improve rescue efficiency. The integrated sensing and communication (ISAC) technology will become a key technology to support the quality assurance of emergency communication and sensing service because it supports the sharing of wireless communication and radar sensing in hardware platforms and spectrum resources, and can improve spectrum utilization and reduce the complexity and overhead of hardware design.

At present, the research on ISAC in emergency scene at home and abroad mainly focuses on unmanned aerial vehicle (UAV) networking optimization and resource scheduling optimization. In the UAV networking optimization, the patent document with the application number of CN202110631951.9 (corresponding to the publication number of CN113543066A) disclosed a sensing, communication and guiding integrated interaction and multi-target emergency networking method and system. The method of this patent document determined a task energy consumption of a target UAV in a target task role according to the target task role of the UAV in a to-be-networked target region, and determined a to-be-solved target optimization problem in the target region according to the task energy consumption of the target UAV. According to the flight energy consumption of the target UAV and target constraint conditions followed by the target optimization problem, a target optimization problem was formulated to optimize the UAV position, the UAV resource allocation scheme and the UAV scheduling strategy of the target region, and the UAVs in the target area were networked according to the optimization results.

Although this method considers the deployment of emergency networking under limited power constraints and solves the problems of insufficient network flexibility and distributed construction at present, it ignores the requirements of high-speed and low-delay data transmission in emergency scenarios, which will lead to a large transmission delay of packets with high latency (i.e., time-delay) requirements during inter-UAV transmission, and reduce the rescue efficiency.

The patent document with the application number of CN202311443778.5 (corresponding to the publication number of CN117693009A) discloses a scheduling method and system for communication UAV group. The method of this patent document includes the following steps: first, obtained a current actual position of a user by using an ISAC signal, and determined a first distribution position of the UAV group according to the current actual position of the user through employing a clustering algorithm; second, according to a historical position of the user and a corresponding historical communication service request, predicted a predicted position of the user at the next moment and a predicted value of the corresponding communication service request, and taken the predicted value as prior information; next, utilized a reinforcement learning model to determine a transmitting power distribution scheme to maximize the network utility; finally, adjusted the UAV group to a second distribution position according to the first distribution position, the predicted position of the user at the next moment and the transmitting power distribution scheme, thereby achieving the effect of ensuring the communication rate and quality of the user in multi-emergency scenarios, and network resources can be used efficiently. However, this method neglects the comprehensive influence of sensing and communication performance on the UAV networking position jointly because of the lack of an integrated communication-sensing coupled framework, which will lead to insufficient measurement accuracy of UAV's sensing information such as user position and moving speed, and affect the efficiency of the UAVs in performing rescue missions.

In the resource scheduling optimization, the patent document with the application number of CN202111206099.7 (corresponding to the publication number of CN113939034A) disclosed a cloud-side collaborative resource allocation method for three-dimensional heterogeneous power Internet of Things (IoT). In the method of this patent document, by constructing a system model, a three-dimensional heterogeneous power IoT scene composed of satellites and UAVs was established and the model was refined, a queuing latency constraint and joint optimization problem was formulated, and the optimization problem is solved based on Lyapunov optimization principle.

Finally, a cloud-side collaborative task unloading decision algorithm based on deep reinforcement learning was designed. This method of solving high-level task offloading problems based on deep reinforcement learning effectively solves the problem of dimension disaster under information uncertainty, but because this method focuses on the design of resource allocation scheme in cloud, edge and end scenarios, the base station is often damaged in emergency post-disaster scenarios, so it is not suitable for emergency rescue communication networks.

SUMMARY

The purpose of the disclosure is to provide a sensing coupled emergency communication service quality assurance method to improve the measurement accuracy and the efficiency of UAVs in rescue tasks, meet the multi-user heterogeneous communication latency requirements and sensing requirements, and ensure the quality of service of communication and sensing (also referred to as ISAC) of users, in view of the above mentioned deficiencies of the related art.

The technical idea to achieve the above purpose is: performing matched filtering on echo signals and modeling user existence as a binary hypothesis problem to meet the high-precision user sensing measurement; on the basis of effective capacity theory, coupling a sensing indicator and a communication indicator into a target expression to meet requirements of communication and sensing indicators of the user at the same time; taking the coupled expression as the objective function to optimize the multi-user power allocation under the constraints of power and sensing performance, thereby realizing the guarantee of user sensing and communication service quality.

According to the above idea, the implementation steps of the method provided by the disclosure include the following steps (1) to (4).

In the step (1), a communication latency index $\theta$ is determined, and an effective capacity C of a corresponding user is obtained.

The step (1) includes the following steps (1a) to (1b).

In the step (1a), the communication latency index $\theta$ is taken as a communication quality of service (QoS) indicator, a receive signal of each user and a signal to interference plus noise ratio (SINR) $\gamma$ of the corresponding user (such as SINR $\gamma_m$ of the m-th user) are obtained according to a general expression of multiple-in multiple-out (MIMO) signals, and a communication rate R of the corresponding user (such as communication rate $R_m$ of the m-th user) is obtained by Shannon's theorem based on $\gamma$.

In the step (1b), according to the communication rate R, an expression of the effective capacity C of the corresponding user is calculated by using the effective capacity theory.

In the step (2), a detection probability $P_d$ and a false alarm rate $P_f$ are determined.

The step (2) includes the following steps (2a) to (2c).

In the step (2a), according to a total echo signal received by a mobile ISAC base station, the total echo signal is separated to obtain echo signals of respective users by matched filtering.

In the step (2b), signal energy detection is performed on the echo signal of each user, and a user existence problem is modeled as a binary hypothesis model according to different detected energy amplitudes of the echo signals of the users.

In the step (2c), the detection probability $P_d$ and the false alarm rate $P_f$ of the corresponding user are obtained by a binary hypothesis model.

In the step (3), an ISAC indicator coupled framework $C_{P_d}(\theta)$ is built.

The step (3) includes the following steps (3a) and (3b).

In the step (3a), empirical prediction values of probabilities of user existence (also referred to as user presence) and user absence (also referred to as user non-existence) in a detection region are $H_1$ and $H_0$, respectively.

In the step 3b), the two empirical prediction values $H_1$ and $H_0$ are fused with the effective capacity C, the detection probability $P_d$ and the false alarm rate $P_f$ to obtain an expanded effective capacity $C_{P_d}(\theta)$, that is, a fusion framework:

$$C_{P_d}(\theta) = -\frac{1}{\theta}\log\left(E\left[(P_d H_1 + P_f H_0)e^{-\theta R}\right]\right)$$

where E[•] represents solving an expected value.

In the step (4), the QoS of multi-user heterogeneous ISAC is guaranteed.

The step (4) includes the following steps (4a) to (4d).

In the step (4a), the expanded effective capacity of the m-th user is obtained as follows:

$$C_{P_{dm}}(\theta_m) = -\frac{1}{\theta_m}\log\left(E\left[(P_{dm}H_{1m} + P_{fm}H_{0m})e^{-\theta_m R_m}\right]\right),$$

where $C_{P_{dm}}(\theta_m)$ represents the expanded effective capacity of the m-th user, $\theta_m$ represents a communication latency index of the m-th user, $P_{dm}$ represents a detection probability of the m-th user, $P_{fm}$ represents a false alarm rate of the m-th user, $R_m$ represents a communication rate of the m-th user, $H_{1m}$ represents a prior existence probability of the m-th user, and $H_{0m}$ represents a prior non-existence probability of the m-th user; and a total expanded effective capacity of M users is obtained as follows:

$$\sum_{m=1}^{M} C_{P_{dm}}(\theta_m) = C_{P_d}(\theta_1, \ldots, \theta_M),$$

where m=1, 2, . . . , M, and M represents a number of the users.

In the step (4b), $C_{P_d}(\theta_1, \ldots, \theta_M)$ is taken as an objective function, and the power of the M users, their respective detection probabilities $P_d$ and their respective latency indexes $\theta$ as constraints, a multi-user optimization problem P1 is built as follows:

$$P1: \max_{P_c} C_{P_d}(\theta_1, \ldots, \theta_M)$$

$$\text{s.t. } P_{cm} \geq 0, 0 \leq m \leq M$$

$$P_{dm} \geq \eta_m, m = 1, 2, \ldots, M$$

$$P \geq \sum_{m=1}^{M} P_{cm} + \sum_{m=1}^{M} P_{sm}$$

where $P_{cm}$ represents communication power of the m-th user for communication, $P_{sm}$ represents sensing power of the m-th user for sensing, $\eta_m$ represents a lower limit of the detection probability of the m-th user, and P represents total power of the M users.

In the step (4c), the equivalent transformation is performed on the multi-user optimization problem from a non-convex optimization problem to a convex optimization problem.

In the step (4d), by using a convex optimization theory, the communication power $P_{cm}$ allocated to each user in a multi-user system is solved, thereby maximizing the total expanded effective capacity of the multi-user system under the premise of meeting the ISAC demands of the M users, guaranteeing the QoS of the multi-user ISAC, and improving an overall performance of the multi-user system.

Compared with the related art, the disclosure has the following advantages.

1. As the communication latency index $\theta$ is determined as an indicator to measure the communication QoS, the disclosure can reflect the latency sensitivity of user services in an ISAC system and provide guarantee for low-latency communication services.

2. As the communication latency index θ, detection probability $P_d$ and false alarm probability $P_f$ of each user are independently determined in the multi-user system, the disclosure can ensure the diversity and difference of ISAC services in post-disaster emergency rescue.

3. Because of the combination of $P_d$, $P_f$ and the effective capacity theory, the disclosure constructs an ISAC framework with ISAC indicators, which can simultaneously guarantee the service quality of multi-user heterogeneous sensing services and latency-sensitive communication services.

DETAILED DESCRIPTION OF EMBODIMENTS

In order to make those skilled in the art better understand the scheme of the disclosure, the technical scheme in the embodiment of the disclosure will be described clearly and completely with the attached drawings. Apparently, the described embodiment is only a part of the embodiment of the disclosure, but not the whole embodiment. Based on the embodiment in the disclosure, other embodiments obtained by those skilled in the art without creative labor should belong to the protection scope of the disclosure.

It should be noted that the step numbers in the description and claims of the disclosure are only for the purpose of clearly describing the embodiment of the disclosure and facilitating understanding, and the sequence of their numbers is not limited.

Figure 2:
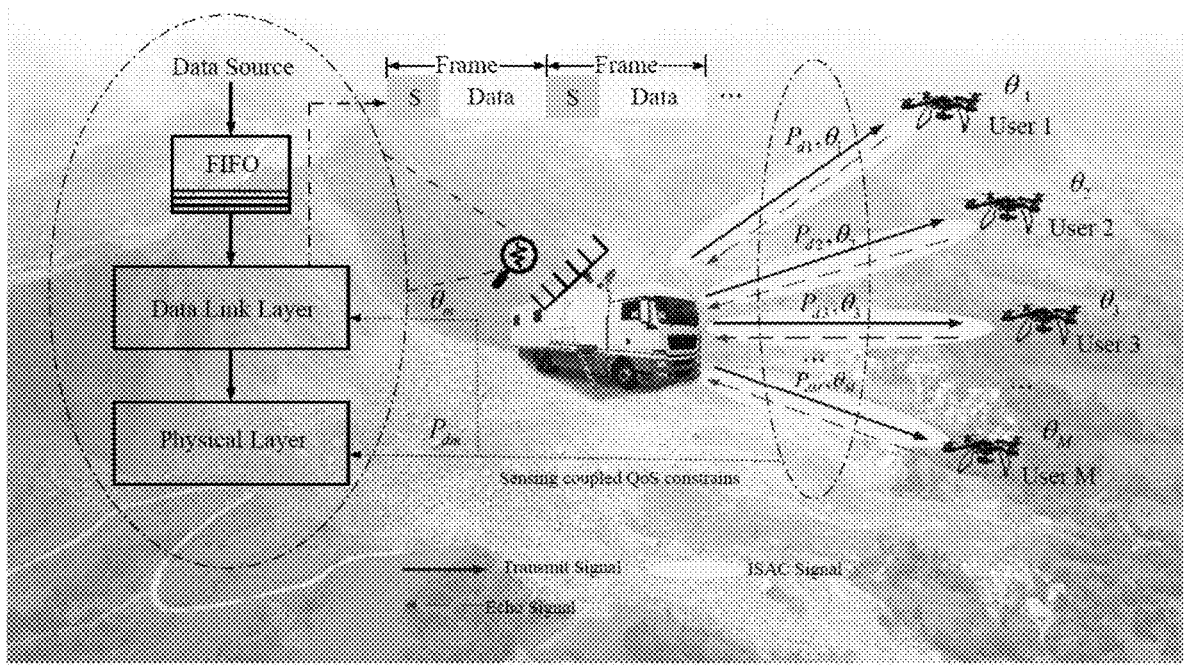
FIG. 2 illustrates an implementation scenario diagram of the emergency communication service quality assurance method of the disclosure.

Referring to FIG. 2, an implementation scenario of the embodiment includes an emergency vehicle and M numbers of UAV users (i.e., M users). As a mobile ISAC base station, the emergency vehicle transmits radar-communication dual-function signals to the M users for user detection and downlink communication, in which each communication link has the property of Nakagami-m fading. The emergency vehicle obtains the detection probability of each user through the radar echo signal, and allocates the transmission power by combining with the preset user latency index θ, so as to ensure the QoS of ISAC for the M users.

Figure 1:
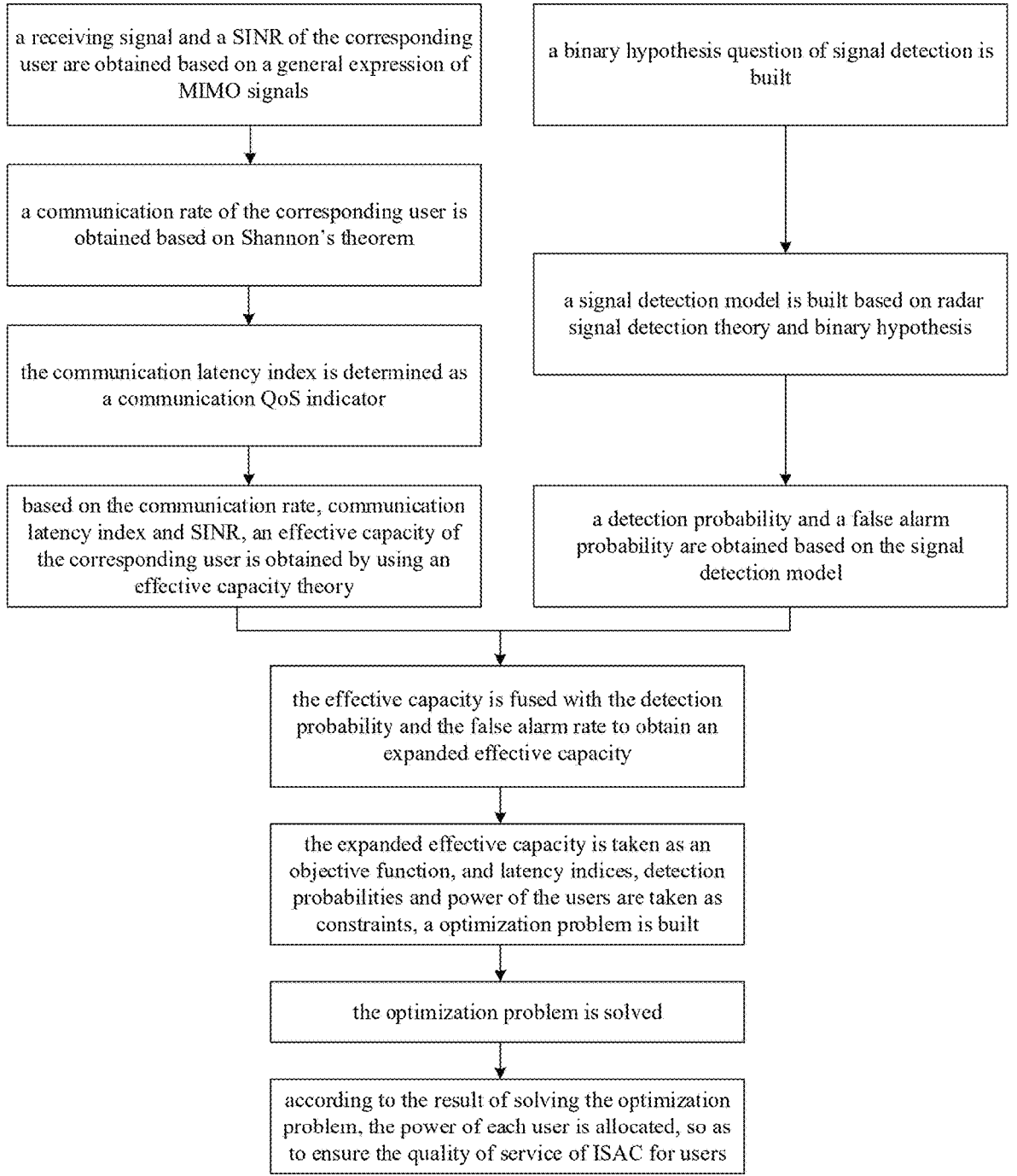
FIG. 1 illustrates an implementation flowchart of an emergency communication service quality assurance method of the disclosure.

Referring to FIG. 1, in the embodiment, a sensing coupled emergency communication service quality assurance method is implemented in the above scenario, and its implementation includes the following steps 1 to 4.

In the step 1, a communication QoS indicator is determined and an effective capacity C is calculated.

The step 1 includes the following steps 1.1 to 1.3.

In the step 1.1, a communication latency index θ is taken as the communication QoS indicator.

In the step 1.2, the effective capacity C is calculated.

The effective capacity C refers to a maximum source rate that can be supported when the time-varying channel capacity meets the QoS indicator. In order to obtain the effective capacity C of the user, it is necessary to express a communication rate R of the corresponding user according to a calculation process of MIMO signals, and the specific implementation process includes the following steps 1.2.1 to 1.2.8.

In the step 1.2.1, $\Delta = \{1, 2, \ldots, M\}$ represents a user index, and baseband signals s(l) sent by a mobile ISAC base station (abbreviated as base station) to the M users in the l-th time slot are as follows:

$$s(l) = [s_1(l), s_2(l), s_m(l), \ldots, s_M(l)]^T \in \complement^M$$

where $m = 1, 2, \ldots, M$, $s_m(l)$ represents the baseband signal sent by the mobile ISAC base station to the m-th user, $[\ ]^T$ represents a transpose, and $\square^M$ represents a matrix with M rows and 1 column.

In the step 1.2.2, W represents a precoding matrix of the base station:

$$W = [w_1, w_2, w_m, \ldots, w_M] \in \square^{N_t \times M}$$

where $w_m$ represents a precoding vector corresponding to the m-th user, $N_t$ represents the number of transmit antennas on the base station, and $\square^{N_t \times M}$ represents a matrix with $N_t$ rows and M columns.

In the step 1.2.3, transmit signals x(l) of the base station are obtained as follows:

$$x(l) = Ws(l)$$

where l represents a time index, $m = 1, 2, \ldots, M$, $s_m(l)$ represents the baseband signal transmitted to the m-th user.

In the step 1.2.4, H represents a channel gain matrix in a signal propagation space, and n(l) represents a noise matrix of the signal, according to the expression of the MIMO signals, a total signal matrix y(l) received at all users is calculated as follows:

$$y(l) = Hx(l) + n(l)$$

In the step 1.2.5, a m-th vector of the total signal matrix y(l) is taken as the receive signal of the m-th user, the m-th vectors of the channel matrix H, the transmit signal matrix x(l) and the noise matrix n(l) are sequentially extracted as follows.

The m-th vector $h_m$ of the channel matrix H is taken as a channel state between the base station and the m-th user.

The m-th vector $x_m(l)$ of the transmit signal matrix x(l) is taken as the transmit signal from the base station to the m-th user.

The m-th vector $n_m(l)$ of the noise matrix n(l) is taken as the noise vector.

In the step 1.2.6, $P_{cm}$ represents the communication power for the base station to the m-th user, $P_{ci}$ represents the communication power for the base station to another user, and the receive signal $y_m(l)$ of the m-th user is calculated as follows:

$$y_m(l) = \sqrt{P_{cm}}\, h_m^T x(l) + n_m(l)$$
$$= \sqrt{P_{cm}}\, h_m^T x_m(l) + h_m^T \sum_{i \neq m}^{M} \sqrt{P_{ci}}\, x_i(l) + n_m(l)$$

where $x_i(l)$ represents the transmit signal from the base station to the another user, which is considered as the interference received by the m-th user, and $[\ ]^T$ represents a transpose.

In the step 1.2.7, the SINR $\gamma_m$ of the m-th user is obtained according to the receive signal $y_m(l)$ of the m-th user:

$$\gamma_m = \frac{P_{cm}\|h_m^T\|^2}{\sum_{i \neq m}^{M} P_{ci}\|h_m^T\|^2 + \sigma_c^2}$$

$$\text{where } \|h_m^T\|^2$$

represents 2 norm of the transpose of the channel between the base station and the m-th user, and $\sigma_c^2$ represents the noise power.

In the step 1.2.8, according to Shannon's theorem, the communication rate $R_m$ of the m-th user is obtained as follows:

$$R_m = \log(1 + \gamma_m)$$

In the step 1.3, based on the $\theta$ and calculated R, the expression for the effective capacity C is as follows:

$$C = -\frac{1}{\theta}\log\left(E\left[e^{-\theta R}\right]\right)$$

In the step 2, a signal detection model is established. The step 2 includes the following steps 2.1 to 2.2.

In the step 2.1, the emergency vehicle is equipped with uniform linear arrays (ULA) with a half-wavelength interval, and a transmitting guide vector $a_t(\phi)$ and a receiving guide vector $a_r(\phi)$ are obtained respectively as follows:

$$a_t(\phi) = \sqrt{\frac{1}{N_t}}\left[1, e^{\frac{j2\pi d \sin\phi}{\lambda}}, \dots, e^{\frac{j2\pi(N_t-1)d\sin\phi}{\lambda}}\right]^T$$

$$a_r(\phi) = \sqrt{\frac{1}{N_r}}\left[1, e^{\frac{j2\pi d \sin\theta}{\lambda}}, \dots, e^{\frac{j2\pi(N_r-1)d\sin\phi}{\lambda}}\right]^T$$

where $\phi$ represents a signal angle, $N_r$ represents the number of receive antennas on the base station, $N_t$ represents the number of transmit antennas on the base station, $\lambda$ represents the carrier wavelength, d represents the distance between base station antennas, and $[\ ]^T$ represents a transpose.

In the step 2.2, the target detection task is completed by determining the energy of the echo signal in the sensing scene. The step 2.2 includes the following steps 2.2.1 to 2.2.11.

In the step 2.2.1, $F=[f_1, f_2, f_m \dots f_M] \in \square^{N_r \times M}$ represents the receive beamforming matrix of the base station, $f_i$ represents a receive beamforming vector corresponding to the i-th user, $i=1, 2, \dots, M$, $\square^{N_r \times M}$ represents a matrix with $N_r$ rows and M columns, the echo signal $r(l)$ received by the base station is calculated based on the power of the m-th user for sensing $P_{sm}$, the combination of radar cross section and path loss of the m-th user $\xi_m$, and the receive noise $z_r(l)$ of the base station:

$$r(l) = F^H \sum_{m=1}^{N} \sqrt{P_{sm}}\, \xi_m a_r(\phi_m) a_t^H(\phi_m) x(l) + z_r(l)$$

where $(\square)^H$ represents a conjugate transpose, $P_{sm}$ represents an energy used by the m-th user for sensing, $\xi_m$ represents the combination of radar cross section and path loss of the m-th user, $\phi_m$ represents a signal angle of the m-th user, $$a_t^H(\phi_m)$$

represents a conjugate transpose of $a_t(\phi_m)$, and $z_r(l)$ represents a receiving noise of the mobile ISAC base station.

In the step 2.2.2, the transmit beamforming vector and receive beamforming vector of the base station are respectively represented as $w_j$ and $f_k$:

$$w_j = a_t(\phi_j), \quad f_k = a_r(\phi_k)$$

where $\phi_j$ represents the estimated value of angle of departure (AoD), and $\phi_k$ represents the estimated value of angle of arrival (AoA).

In the step 2.2.3, the base station performs matched filtering on the receive echo signal by using $s_m(l)$ to obtain the detection signal $y_{rm}$ from the m-th user, in order to achieve better detection performance:

$$y_{rm} = \int r_m(l) s_m^*(l) dt$$

where $r_m(l)$ represents the m-th vector of $r(l)$, $s_m(l)$ represents the m-th vector of the baseband signal $s(l)$, and $[\ ]^*$ represents complex conjugate.

In the step 2.2.4, the receive beamforming gain is calculated based on the transmit beamforming vector $w_m$ applied by the base station to the m-th user:

$$A_r = \left| a_r^H(\phi_m) w_m \right|.$$

In the step 2.2.5, the transmit beamforming gain is calculated based on the receive beamforming vector $f_m$ applied by the base station to the m-th user:

$$A_t = \left| a_t^H(\phi_m) f_m \right|.$$

In the step 2.2.6, the m-th vector of the receive noise $z_r(l)$ of the base station is represented as $z_{rm}(l)$, and the sensing noise of the m-th user received through the matched filtering is calculated:

$$z_m = \int z_{rm}(l) s_m^*(l) dt.$$

In the step 2.2.7, based on the echo signal $r(l)$, the receive beamforming gain $A_r$, the transmit beamforming gain $A_t$ and the sensing noise $z_m$ of the m-th user, $y_{rm}$ is further expanded as follows:

$$y_{rm} = \sqrt{P_{sm}} \, \xi_m A_r A_t + z_m$$

In the step 2.2.8, a target detection task is described as the following binary hypothesis problem:

$H_0$: There is no target $H_1$: There is target

In the step 2.2.9, based on the binary hypothesis problem and the expanded detection signal $y_{rm}$, the target detection problem is described as follows:

$$y_{rm} = \begin{cases} z_m, & H_0 \\ \sqrt{P_{sm}} \, \xi_m A_r A_t + z_m, & H_1 \end{cases}$$

In the step 2.2.10, based on the radar signal detection theory and binary hypothesis question, the specific distribution of the energy $|y_{rm}|^2$ of the echo signal received by the base station in two different target states is calculated as follows.

When the target in the detection region does not exist, since the signal energy only contains noise power, according to the target detection model, the distribution followed by the echo signal energy at this time is calculated as $$\frac{N_r \sigma_m^2}{2} \chi_2^2,$$

where $$\sigma_m^2$$

is the power of the sensing noise $z_m$, and $$\chi_2^2$$

is a chi-square distribution with 2 degrees of freedom.

When the target exists in the detection region, since the signal energy contains both transmission power and noise power, according to the target detection model, the distribution followed by the echo signal energy at this time is calculated as $$\left( \frac{N_r \sigma_m^2}{2} + \frac{P_{sm} \xi_m^2 A_r^2 A_t^2}{2} \right) \chi_2^2.$$

In the step 2.2.11, based on the different distribution expressions of the detection energy signal $|y_{rm}|^2$ in two scenarios, the signal detection model is described as follows:

$$|y_{rm}|^2 \sim \begin{cases} \dfrac{N_r \sigma_m^2}{2} \chi_2^2, & H_0 \\ \left( \dfrac{N_r \sigma_m^2}{2} + \dfrac{P_{sm} \xi_m^2 A_r^2 A_t^2}{2} \right) \chi_2^2, & H_1 \end{cases}$$

where $\sim$ represents that the signal energy follows a certain distribution.

In the step 3, according to the signal energy detection model, the detection probability P and the false alarm probability $P_f$ of the user are calculated, and the expanded effective capacity $C_{P_{dm}}(\theta_m)$ of the m-th user is established. The step 3 includes the following step 3.1 to step 3.4.

In the step 3.1, the detection threshold $\varepsilon$ is calculated based on the energy distribution expression of the echo signal under the signal detection model $H_0$:

$$\varepsilon = \frac{N_r \sigma_m^2}{2} F_{\chi_2^2}^{-1}(1 - P_f)$$

where $F_{\chi_2^2}^{-1}(\cdot)$ represents the inverse of the cumulative distribution function of the chi-square distribution with 2 degrees of freedom.

In the step 3.2, the false alarm probability $P_f$ of the user is calculated based on the detection threshold $\varepsilon$:

$$P_f = Pr\left( \chi_2^2 > \frac{2\varepsilon}{N_r \sigma_m^2} \right)$$

where $Pr(\ )$ represents the probability calculation.

In the step 3.3, according to the energy distribution expression of the echo signal in the signal detection model under $H_1$, the detection probability $P_d$ of the user is calculated:

$$P_d = Pr\left( |y_{rm}|^2 > \varepsilon \,|\, H_1 \right)$$

$$= 1 - F_{\chi_2^2}\left( \frac{2\varepsilon / (N_r \sigma_m^2)}{1 + P_{sm} \xi_m^2 A_r^2 A_t^2 / N_r \sigma_m^2} \right)$$

where $F_{\chi_2^2}(\cdot)$ represents the cumulative distribution function of the chi-square distribution with 2 degrees of freedom.

In the step 3.4, the expanded effective capacity $C_{P_{dm}}(\theta_m)$ of the m-th user is calculated based on the effective capacity C, the detection probability $P_{dm}$ of the m-th user, and the false alarm rate $P_{fm}$ of the m-th user:

$$C_{P_{dm}}(\theta_m) = -\frac{1}{\theta_m} \log\left( E\left[ (P_{dm} H_{1m} + P_{fm} H_{0m}) e^{-\theta R_m} \right] \right)$$

where $\theta_m$ represents the latency index of the m-th user, $H_{1m}$ represents the prior existence probability of the m-th user, and $H_{0m}$ represents the prior non-existence probability of the m-th user.

In the step 4, a multi-user optimization problem is established to ensure the QoS of ISAC for the users. The step 4 includes the step 4.1 to step 4.3.

In the step 4.1, an aggregated effective capacity $C_{P_d}(\theta_1, \ldots, \theta_M)$ of the M users in the system is calculated based on the expanded effective capacity $C_{P_{dm}}(\theta_m)$ of the m-th user:

$$C_{P_d}(\theta_1, \ldots, \theta_M) = \sum_{m=1}^{M} C_{P_{dm}}(\theta_m)$$

In the step 4.2, a multi-user optimization problem P1 with $C_{P_d}(\theta_1, \ldots, \theta_M)$ as the objective function, the M users' power, detection probabilities of the M users, and latency indexes of the M users as constraints is constructed:

$$P1: \max_{P_c} C_{P_d}(\theta_1, \ldots, \theta_M)$$

$$\text{s.t. } P_{cm} \geq 0, 0 \leq m \leq M$$

$$P_{dm} \geq \eta_m, m = 1, 2, \ldots, M$$

$$P \geq \sum_{m=1}^{M} P_{cm} + \sum_{m=1}^{M} P_{sm}$$

where $P_{cm}$ and $P_{sm}$ represent respectively communication power of the m-th user for communication and sensing power of the m-th user for sensing, $\eta_m$ represents a lower limit of the detection probability of the m-th user, P is total power of the M users, and M represents the number of users.

In the step 4.3, the multi-user optimization problem P1 is solved.

The step 4.3 includes the following steps 4.3.1 to 4.3.7.

In the step 4.3.1, the objective function is equivalently transformed to simplify the solving process of the optimization problem.

The step 4.3.1 includes the following steps 4.3.1.1 to 4.3.1.5.

In the step 4.3.1.1, based the aggregated effective capacity $C_{P_d}(\theta_1, \ldots, \theta_M)$ of the M users, the effective capacity theoretical property and the boundedness of $C_{P_d}(\theta_1, \ldots, \theta_M)$, the following relationship is obtained:

$$0 \leq C_{min}(\theta_1, \ldots, \theta_M) \leq C_{P_d}(\theta_1, \ldots, \theta_M) \leq C_{max}(\theta_1, \ldots, \theta_M)$$

$$\text{where } C_{min}(\theta_1, \ldots, \theta_M) = -\frac{1}{\theta_{max}}\log\left(E\left[\prod_{m=1}^{M} A_m e^{-\sum_{m=1}^{M}\theta_m \log(1+\gamma_m)}\right]\right)$$

is a lower limit of $C_{P_d}(\theta_1, \ldots, \theta_M)$, $$C_{max}(\theta_1, \ldots, \theta_M) = -\frac{1}{\theta_{min}}\log\left(E\left[\prod_{m=1}^{M} A_m e^{-\sum_{m=1}^{M}\theta_m \log(1+\gamma_m)}\right]\right)$$

is an upper limit of $C_{P_d}(\theta_1, \ldots, \theta_M)$, $A_m = P_{dm}H_{1m} + P_{fm}H_{0m}$ is a total probability of base station sending information, $\gamma_m$ is the SINR of the m-th user, $\theta_{max} = \max(\theta_1, \theta_2, \theta_m, \ldots, \theta_M)$ is the maximum value obtained from $(\theta_1, \theta_2, \theta_m, \ldots, \theta_M)$, $\theta_{min} = \min(\theta_1, \theta_2, \theta_m, \ldots, \theta_M)$ is the minimum value obtained from $(\theta_1, \theta_2, \theta_m, \ldots, \theta_M)$, and $\theta_m$ is the latency index of the m-th user, and E represents solving an expected value.

In the step 4.3.1.2, based on the total probability $A_m$ of the base station sending information, the latency index $\theta_m$ of the m-th user, and the SINR $\gamma_m$ of the m-th user, an equivalent expanded effective capacity function $A(\alpha)$ is defined:

$$A(\alpha) = -\frac{1}{\alpha}\log\left(E\left[\prod_{m=1}^{M} A_m e^{-\sum_{m=1}^{M}\theta_m \log(1+\gamma_m)}\right]\right)$$

In the step 4.3.1.3, based on the continuity property of $A(\alpha)$ on $\alpha \in [\theta_{min}, \theta_{max}]$, the following inequality is obtained:

$$\left|A(\theta_0) - C_{P_d}(\theta_1, \ldots, \theta_M)\right| \leq \tilde{n}$$

where $\theta_0$ is the only real number value obtained on $[\theta_{min}, \theta_{max}]$, and $\tilde{n}$ is a positive real number tending towards 0.

In the step 4.3.1.4, $C_{P_d}(\theta_1, \ldots, \theta_M) = A(\theta_0)$, according to the continuity property of the $A(\alpha)$ function, the following inequality is obtained:

$$\left|\tilde{C}_{P_d}(\theta_1, \ldots, \theta_M) - C_{P_d}(\theta_1, \ldots, \theta_M)\right| \leq \tilde{n}$$

In the step 4.3.1.5, according to the inequality in the step 4.3.1.4, the following equivalent transformation is performed on the expanded effective capacity $C_{P_d}(\theta_1, \ldots, \theta_M)$:

$$C_{P_d}(\theta_1, \ldots, \theta_M) = \tilde{C}_{P_d}(\theta_1, \ldots, \theta_M)$$

$$= -\frac{1}{\theta_0}\log\left(E\left[\prod_{m=1}^{M} A_m e^{-\sum_{m=1}^{M}\theta_m \log(1+\gamma_m)}\right]\right)$$

In the step 4.3.2, according to the equivalent transformation, the optimization problem P1 is rewritten in the following form P2:

$$P2: \min_{P_c} -\frac{1}{\theta_0}\log\left(E\left[\prod_{m=1}^{M} A_m e^{-\sum_{m=1}^{M}\theta_m \log(1+\gamma_m)}\right]\right)$$

$$\text{s.t. } P_{cm} \geq 0, 0 \leq m \leq M$$

$$P_{dm} \geq \eta_m, m = 1, 2, \ldots, M$$

$$P \geq \sum_{m=1}^{M} P_{cm} + \sum_{m=1}^{M} P_{sm}$$

In the step 4.3.3, according to the application scenario of the embodiment, the communication channels of all users conform to the property of Nakagami-m fading, |h| represents a channel response amplitude, $m°$ represents a fading parameter of Nakagami-m distribution, $\Omega$ represents a shape parameter of the channel, and the probability density $f_{|h|}(x)$ of the channel response amplitude |h| is calculated as follows:

$$f_{|h|}(x) = \frac{2(m^\circ)^{m^\circ}}{\Gamma(m^\circ)\Omega^{m^\circ}} x^{2m^\circ-1} e^{-\frac{m^\circ}{\Omega} x^2}$$

of the Lagrange equation:

where x=|h|, and $\Gamma$ represents the chi-square distribution function.

In the step 4.3.4, according to the monotonicity of the log function and the probability density $f_{|h|}(x)$, the optimization problem P2 is further transformed into the following form P3:

$$P3: \min_{P_c} E\left[ \prod_{m=1}^M A_m e^{-\sum_{m=1}^M \theta_m \log(1+\gamma_m)} \right] =$$

$$\min_{P_c} \prod_{m=1}^M A_m \int_0^\infty \prod_{m=1}^M (1+\gamma_m)^{-\beta_m} f_{|h|}(x) dxs$$

$$\text{s.t. } P_{cm} \ge 0, 0 \le m \le M$$

$$P_{dm} \ge \eta_m, m = 1, 2, \ldots, M$$

$$P \ge \sum_{m=1}^M P_{cm} + \sum_{m=1}^M P_{sm}$$

$$\text{where } \beta_m = -\frac{\theta_m}{\ln2},$$

and $f_{|h|}(x)$ represents a probability density distribution followed by the channel amplitude response between the base station and the user.

In the step 4.3.5, the Lagrange equation L is constructed based on the convexity of the optimization problem P3 on the $(P_{c1}, \ldots, P_{cM})$ tensor space:

$$L = \prod_{m=1}^M A_m \int_0^\infty \prod_{m=1}^M (1+\gamma_m)^{-\beta_m} f_{|h|}(x) dx + \lambda_m \left( P - \sum_{m=1}^M P_{cm} - \sum_{m=1}^M P_{sm} \right)$$

where $\lambda_m$ represents the Lagrange multiplier associated with the inequality constraints.

In the step 4.3.6, the partial derivative of the Lagrange equation L with respect to $P_{cm}$ is equal to 0, the following equation is obtained:

$$\frac{\partial L}{\partial P_{cm}} = -\beta_m \|h_m^T\|^2 \left( 1 + \frac{P_{cm} \|h_m^T\|^2}{\sum_{i \ne m}^M P_{ci} \|h_m^T\|^2 + \sigma_c^2} \right)^{-1} \times$$

$$\prod_{m=1}^M \left( \frac{P_{cm} \|h_m^T\|^2}{\sum_{i \ne m}^M P_{ci} \|h_m^T\|^2 + \sigma_c^2} \right)^{-\beta_m} f_{|h|}(x) - \lambda_m f_{|h|}(x) = 0$$

In the step 4.3.7, the communication power $P_{cm}$ allocated to the m-th user by the system is solved according to the partial derivative $$\frac{\partial L}{\partial P_{cm}}$$

$$\mathcal{P}_{cm} = \frac{\sum_{i \ne m}^M \mathcal{P}_{ci} \|h_m^T\|^2 + \sigma_c^2}{\|h_m^T\|^2} \times \frac{\left( \prod_{m=1}^M \lambda_m \right)^{\frac{\beta_m M}{M \beta_m + 1}}}{\frac{\lambda_m}{\beta_m \|h_m^T\|^2} \prod_{m=1}^M (\beta_m \|h_m^T\|^2)^{\frac{\beta_m}{M \beta_m + 1}}}$$

$$\text{where } \|h_m^T\|^2$$

represents the 2 norm of the Nakagami-m channel gain of the m-th user.

By distributing the optimal communication power $P_{cm}$ obtained by solving the optimization problem to each user, the system can adaptively adjust the communication power distribution while meeting the communication latency and sensing accuracy requirements of users, and realize the communication sensing service quality guarantee for users.

The effect of the disclosure can be further illustrated by the following simulation results.

1. Simulation Condition

Condition 1: the simulation platform is MATLAB, which initializes the total number of users as M=2 and the total power of the system as P=25W, and two groups of comparative simulations are carried out according to $P_f=10^{-3}$ and $P_f=10^{-6}$.

Condition 2: the detection probabilities of the user 1 and the user 2 are $P_{d1}=P_{d2}=0.7$, the latency index of the user 1 is $\theta_1=10^{-2}$, and the latency index $\theta_2$ of the user 2 changes in the range of $10^{-6}$ to $10^{-1}$.

Condition 3: the detection probability of the user 1 is $P_{d1}=0.6$, the detection probability of the user 2 is $P_{d2}=0.8$, the latency index of the user 1 is $\theta_1=10^{-2}$, and the latency index $\theta_2$ of the user 2 changes in the range of $10^{-6}$ to $10^{-1}$.

2. Simulation Content

Figure 3:
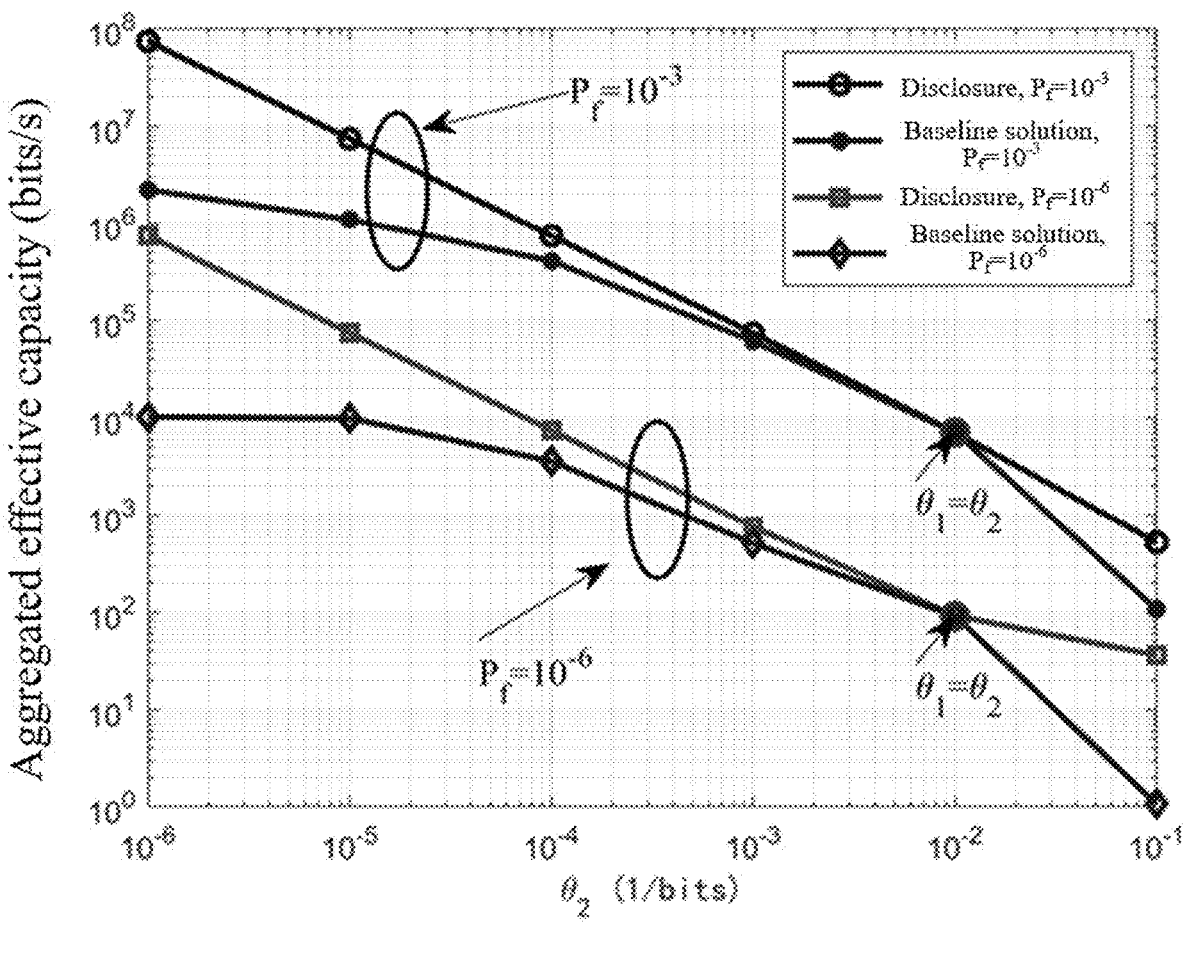
FIG. 3 illustrates a comparison diagram of a multi-user heterogeneous power allocation method obtained according to the latency index θ under multi-users and an isomorphic power allocation method in the disclosure.

In the simulation 1, under the above simulation conditions of condition 1 and condition 2, the method provided by the disclosure and the existing isomorphic power distribution method are individually used to calculate the aggregated effective capacity $C_{P_d}(\theta_1, \ldots \theta_M)$ of the system, and the results are shown in FIG. 3.

As can be seen from FIG. 3, when the detection probability $P_d$ of all users in the system is the same, the sensing indicator no longer constrains the system, and the power allocation scheme at this time degenerates into a power allocation scheme based on heterogeneous communication QoS index in the communication network. When the $\theta$ indices of two users are equal, the aggregated effective capacity of the disclosure is the same as that of the isomorphic power distribution method, but in other cases, the aggregated effective capacity of the disclosure is larger than that of the isomorphic power distribution method.

Figure 4:
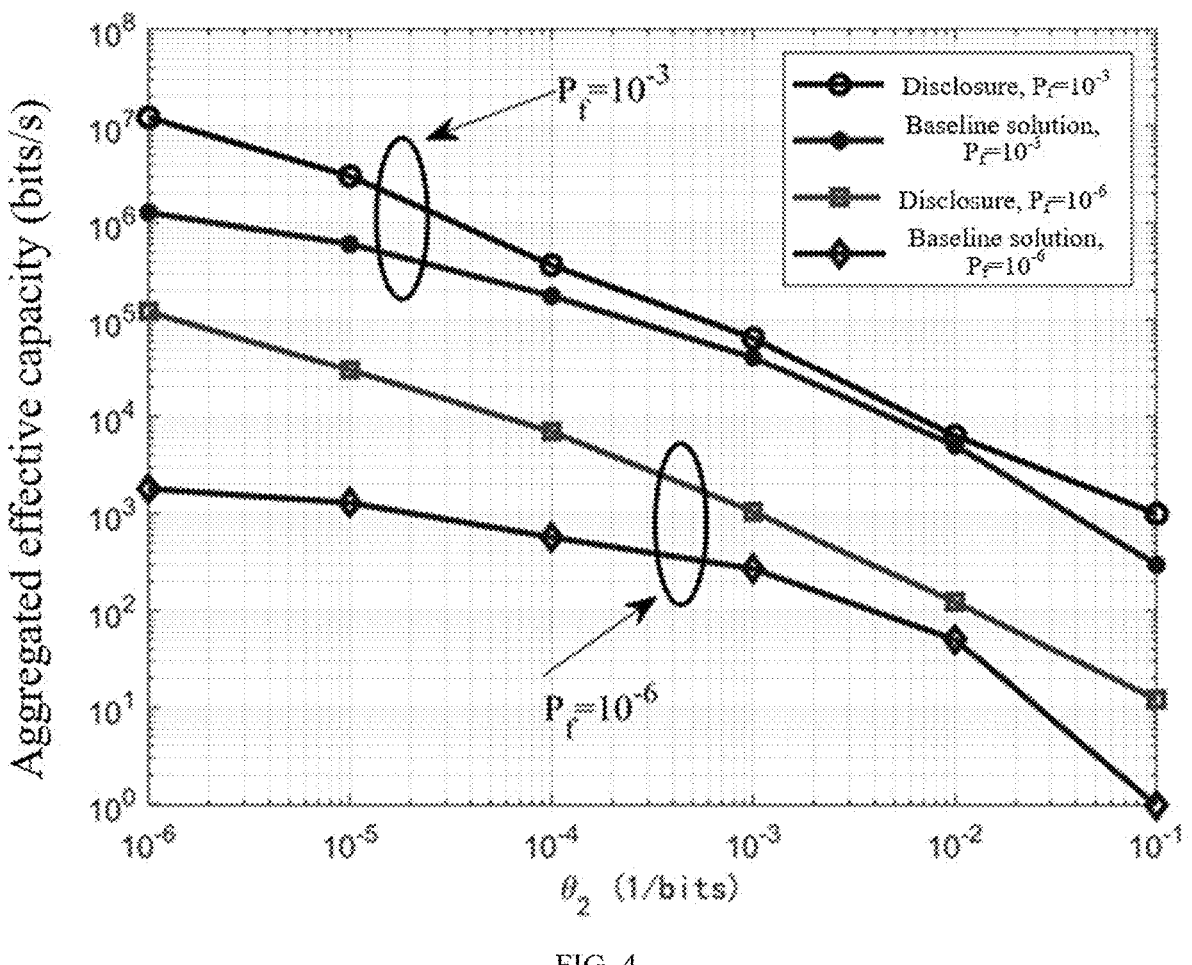
FIG. 4 illustrates a comparison diagram of a multi-user heterogeneous power allocation method obtained according to the latency index θ and detection probability $P_d$ under multi-users and an isomorphic power allocation method in the disclosure.

In the simulation 2, under the simulation conditions of the above conditions 1 and 3, the method provided by the disclosure and the existing isomorphic power distribution method are individually used to calculate the aggregated effective capacity $C_{P_d}(\theta_1, \ldots, \theta_M)$ of the system, and the results are shown in FIG. 4.

As can be seen from FIG. 4, when the detection probability $P_d$ and $\theta$ index of all users in the system are different, the sensing and communication indicators simultaneously constrain the system, and at this time, compared with the isomorphic power distribution method, the disclosure can realize larger aggregated effective capacity in any case.

The above simulation results show that the disclosure can improve the aggregated effective capacity of the system while meeting the requirements of communication latency and sensing accuracy of users, so as to ensure the communication and sensing QoS of the users.

What is claimed is:

1. A sensing coupled emergency communication service quality assurance method, comprising:

(1) obtaining a communication latency index θ and an effective capacity C of a corresponding user:

(1a) taking the communication latency index θ as a communication quality of service (QoS) indicator, obtaining a receive signal of each user and a signal to interference plus noise ratio (SINR) γ of the corresponding user based on a general expression of multiple-in multiple-out (MIMO) signals, and obtaining a communication rate R of the corresponding user by Shannon's theorem based on γ; and (1b) calculating, based on the communication rate R, an expression of the effective capacity C of the corresponding user by using an effective capacity theory;

(2) determining a detection probability $P_d$ and a false alarm rate $P_f$:

(2a) separating, based on a total echo signal received by a mobile integrated sensing and communication (ISAC) base station, the total echo signal to obtain echo signals of respective users by matched filtering;

(2b) performing signal energy detection on the echo signals of the users, and modeling a user existence problem as a binary hypothesis model based on different energy amplitudes of the echo signals of the users; and (2c) obtaining the detection probability $P_d$ and the false alarm rate $P_f$ of the corresponding user by the binary hypothesis model;

(3) building an ISAC indicator coupling framework $C_{P_d}(\theta)$:

(3a) setting empirical prediction values of probabilities of user existence and user non-existence in a detection region be $H_1$ and $H_0$ respectively;

(3b) fusing the empirical prediction values $H_1$ and $H_0$ with the effective capacity C, the detection probability $P_d$ and the false alarm rate $P_f$ to obtain an expanded effective capacity $C_{P_d}(\theta)$, that is, a fusion framework:

$$C_{P_d}(\theta) = -\frac{1}{\theta} \log\left(E\left[(P_d H_1 + P_f H_0)e^{-\theta R}\right]\right)$$

(4) guaranteeing QoS of multi-user heterogeneous ISAC:

(4a) obtaining an expanded effective capacity of a m-th user as follows:

$$C_{P_{dm}}(\theta_m) = -\frac{1}{\theta_m} \log\left(E\left[(P_{dm} H_{1m} + P_{fm} H_{0m})e^{-\theta_m R_m}\right]\right),$$

and obtaining a total expanded effective capacity of M users as follows:

$$\sum\nolimits_{m=1}^{M} C_{P_{dm}}(\theta_m) = C_{P_d}(\theta_1, \ldots, \theta_M),$$

(4b) taking $C_{P_d}(\theta_1, \ldots, \theta_M)$ as an objective function, and taking power of the M users, detection probabilities $P_d$ of the M users and communication latency indices θ of the M users as constraints, building a multi-user optimization problem P1:

$$P1: \max_{\mathcal{P}_c} \ C_{P_d}(\theta_1, \ldots, \theta_M)$$

$$\text{s.t. } \mathcal{P}_{cm} \geq 0, \ 0 \leq m \leq M$$

$$P_{dm} \geq \eta_m, \ m = 1, 2, \ldots, M$$

$$\mathcal{P} \geq \sum\nolimits_{m=1}^{M} \mathcal{P}_{cm} + \sum\nolimits_{m=1}^{M} \mathcal{P}_{sm}$$

where $\mathcal{P}_{cm}$ represents communication power of the m-th user for communication, $\mathcal{P}_{sm}$ represents sensing power of the m-th user for sensing, $\eta_m$ represents a lower limit of a detection probability of the m-th user, and $\mathcal{P}$ represents total power of the M users;

(4c) performing equivalent transformation on the multi-user optimization problem P1 from a non-convex optimization problem to a convex optimization problem; and (4d) solving, by using a convex optimization theory, the communication power $\mathcal{P}_{cm}$ allocated to the m-th user in a multi-user system, thereby making the multi-user system maximize the total expanded effective capacity under a premise of meeting ISAC demands of the M users.

2. The method as claimed in claim 1, wherein in the step (1a), obtaining the receive signal of each user, the SINR γ of the corresponding user, and the communication rate R of the corresponding user, comprises:

making Δ={1, 2, . . . , M} represent a user index, baseband signals s(l) sent by the mobile ISAC base station to the M users in an l-th time slot being as follows:

$$s(l) = [s_1(l), s_2(l), s_m(l), \ldots, s_M(l)]^T \in \mathbb{C}^M$$

where m=1, 2, . . . , M, and $s_m(l)$ represents a baseband signal sent by the mobile ISAC base station to the m-th user;

making $$W = [w_1, w_2, w_m, \ldots, w_M] \in \mathbb{C}^{N_t \times M}$$

represent a precoding matrix, and performing, by the mobile ISAC base station, precoding matrix processing on the baseband signals s(l) to obtain processed transmit signals x(l):

$$x(l) = W \cdot s(l)$$

receiving, by the users, the transmit signals from the mobile ISAC base station to obtain the receive signals of the users, wherein the receive signal $y_m(l)$ of the m-th user in the l-th time slot is as follows:

$$y_m(l) = \sqrt{\mathcal{P}_{cm}} \ h_m^T x(l) + n_m(l) = \sqrt{\mathcal{P}_{cm}} \ h_m^T x_m(l) + h_m^T \sum_{i \neq m}^{M} \sqrt{\mathcal{P}_{ci}} \ x_i(l) + n_m(l)$$

where $\mathcal{P}_{cm}$ represents the communication power of the m-th user, $\mathcal{P}_{ci}$ represents communication power of another user, $n_m(l)$ represents a white Gaussian noise with variance of $\sigma_c^2$ received by the m-th user, $x_m(l)$ represents a transmit signal sent by the mobile ISAC base station to the m-th user, $x_i(l)$ represents a transmit signal sent by the mobile ISAC base station to the another user, $h_m \in \mathbb{C}^{1 \times N_t}$ represents a channel between the m-th user and the mobile ISAC base station, $$h_m^T$$

represents a transpose of $h_m$, an amplitude response of the channel follows Nakagami-m fading, and a probability density $f_{|h|}(x)$ of the channel follows the following distribution:

$$f_{|h|}(x) = \frac{2(m^\circ)^{m^\circ}}{\Gamma(m^\circ)\Omega^{m^\circ}} x^{2m^\circ - 1} e^{-\frac{m^\circ}{\Omega} x^2}$$

where $\Omega = \mathbb{E}[|h|^2]$ represents a shape parameter, $\mathbb{E}$ represents solving an expected value, $|h|$ represents channel amplitude gain, $x = |h|$, $m^\circ$ represents a fading parameter of Nakagami-m distribution and $\Gamma$ represents a chi-square distribution function;

obtaining, based on the receive signals of the users, a SINR $\gamma_m$ of the m-th user:

$$\gamma_m = \frac{\mathcal{P}_{cm}\|h_m^T\|^2}{\sum_{i \neq m}^{M} \mathcal{P}_{ci}\|h_m^T\|^2 + \sigma_c^2} \text{ where } \|h_m^T\|^2$$

represents 2 norm of the transpose of the channel between the m-th user and the mobile ISAC base; and obtaining a communication rate $R_m$ of the m-th user according to the SINR $\gamma_m$.

$$R_m = \log(1 + \gamma_m).$$

3. The method as claimed in claim 2, wherein in the step (1b), the effective capacity C of the corresponding user is calculated by using the effective capacity theory, and the formula is as follows:

$$C = -\frac{1}{\theta}\log\left(\mathbb{E}[e^{-\theta R}]\right)$$

where $\theta$ represents the communication latency index of the corresponding user, R represents the communication rate of the corresponding user, and $\mathbb{E}$ represents solving an expected value.

4. The method as claimed in claim 3, wherein in the step (2a), separating the total echo signal received by the mobile ISAC base station into the echo signal of each user by the matched filtering, comprises:

the mobile ISAC base station being equipped with uniform linear arrays (ULA) with a half-wavelength interval, obtaining a receiving guide vector $a_r(\phi)$ and a transmitting guide vector $a_t(\phi)$ generated by the mobile ISAC base station as follows:

$$a_r(\phi) = \sqrt{\frac{1}{N_r}}\left[1, e^{\frac{j2\pi d\sin\phi}{\lambda}}, \ldots, e^{\frac{j2\pi(N_r - 1)d\sin\phi}{\lambda}}\right]^T$$

$$a_t(\phi) = \sqrt{\frac{1}{N_t}}\left[1, e^{\frac{j2\pi d\sin\phi}{\lambda}}, \ldots, e^{\frac{j2\pi(N_r - 1)d\sin\phi}{\lambda}}\right]^T$$

where $\phi$ represents a signal angel, $N_r$ represents a number of receive antennas on the mobile ISAC base station, $N_t$ represents a number of transmit antennas on the mobile ISAC base station, $\lambda$ represents a carrier wavelength, d represents a distance between antennas on the mobile ISAC base station, and $[\ ]^T$ represents a transpose;

after sensing signals transmitted by the mobile ISAC base station are reflected by the M users, obtaining the total echo signal r(l) as follows:

$$r(l) = F^H \sum_{m=1}^{N} \sqrt{\mathcal{P}_{sm}} \xi_m a_r(\phi_m) a_t^H(\phi_m) x(l) + z_r(l)$$

where $F = [f_1, f_2, f_i, \ldots, f_M] \in \mathbb{C}^{N_r \times M}$ represents a receive beamforming matrix of the mobile ISAC base station, $(\bullet)^H$ represents a conjugate transpose, $\mathcal{P}_{sm}$ represents an energy used by the m-th user for sensing, $\xi_m$ represents a combination of radar cross section and path loss of the m-th user, $\phi_m$ represents a signal angle of the m-th user, $$a_t^H(\phi_m)$$

represents a conjugate transpose of $a_t(\phi_m)$, and $z_r(l)$ represents a receiving noise of the mobile ISAC base station;

making transmitting and receiving beamforming vectors of the mobile ISAC base station respectively be $w_j$ and $f_k$:

$$w_j = a_t(\widehat{\phi_t}) \quad f_k = a_r(\widehat{\phi_k})$$

where $\widehat{\phi_j}$ represents an estimated value of angle of departure (AoD), and $\widehat{\phi_k}$ represents an estimated value of angle of arrival (AoA);

performing, by the mobile ISAC base station, the matched filtering on the total echo signal r(l) to obtain the echo signal of the corresponding user $y_r$:

$$y_r = \sqrt{\mathcal{P}_{sm}} \xi_m |a_r^H(\phi_m) w_m| |a_t^H(\phi_m) f_m| + z_m = \sqrt{\mathcal{P}_{sm}} \xi_m A_r A_t + z_m$$

where $\phi_m$ represents the signal angle of the m-th user, $w_m$ represents a transmit beamforming vector applied by the base station to the m-th user, $f_m$ represents a receive beamforming vector applied by the base station to the m-th user, $z_m$ represents a sensing noise of the m-th user, $$A_r = |a_r^H(\phi_m) w_m|$$

represents receive beamforming gain, and $$A_t = \left| a_t^H(\phi_m) f_m \right|$$

represents transmit beamforming gain.

5. The method as claimed in claim 1, wherein in the step (2b), modeling the user existence problem as the binary hypothesis model, comprises:

describing an object detection problem as a binary hypothesis problem as follows:

$\mathcal{H}_0$ there is no target $\mathcal{H}_1$ there is target based on the above description, building a target detection model as follows:

$$x_m = \begin{cases} z_m, & \mathcal{H}_0 \\ \sqrt{\mathcal{P}_{sm}} \, \xi_m A_r A_t + z_m, & \mathcal{H}_1 \end{cases}$$

where $x_m$ represents the echo signal of the m-th user separated by the mobile ISAC base station, $\mathcal{P}_{sm}$ represents an energy used by the m-th user for sensing, $\xi_m$ represents a combination of radar cross section and path loss of the m-th user, $A_r$ represents receiving beamforming gain, $A_t$ represents transmitting beamforming gain, and $z_m$ represents a sensing noise of the m-th user;

expressing the target detection model as the following energy detector:

$$|x|^2 \sim \begin{cases} \dfrac{N_r \sigma_m^2}{2} \chi_2^2, & \mathcal{H}_0 \\ \left( \dfrac{N_r \sigma_m^2}{2} + \dfrac{\mathcal{P}_{sm} \xi_m^2 A_r^2 A_t^2}{2} \right) \chi_2^2, & \mathcal{H}_1 \end{cases}$$

where $|x|^2$ represents a signal energy received by the mobile ISAC base station, $\sim$ represents that signal energy obeys a certain distribution, $N_r$ represents a number of receive antennas on the mobile ISAC base station, $$\sigma_m^2$$

represents noise power sense by the m-th user, $\underline{\mathcal{P}_{sm}}$ represents the energy used by the m-th user for sensing, and $$\chi_2^2$$

represents a chi-square distribution with 2 degrees of freedom.

6. The method as claimed in claim 1, wherein in the step (2c), the obtaining the detection probability $P_d$ and the false alarm rate $P_f$ of the corresponding user by the binary hypothesis model, comprises:

obtaining, based on a number of receive antennas on the mobile ISAC base station $N_r$ and noise power $$\sigma_m^2$$

sensed by the m-th user, the false alarm probability $P_f$ of the corresponding user as follows:

$$P_f = Pr\left( \chi_2^2 > \frac{2\varepsilon}{N_r \sigma_m^2} \right)$$

where Pr( ) represents a probability calculation, $$\chi_2^2$$

represents a chi-square distribution with 2 degrees of freedom, $$\varepsilon = \frac{N_r \sigma_m^2}{2} F_{\chi_2^2}^{-1}(1 - P_f)$$

represents a detection threshold obtained by $P_f$, and $$F_{\chi_2^2}^{-1}(\cdot)$$

represents an inverse or a cumulative distribution function of the chi-square distribution with 2 degrees of freedom;

based on a signal energy $|x|^2$ received by the mobile ISAC base station, the number of the receive antennas on the mobile ISAC base station $N_r$, the noise power $$\sigma_m^2$$

sensed by the m-th user, power used by the m-th user for sensing $\mathcal{P}_{sm}$, the detection threshold $\varepsilon$, receive beamforming gain $A_r$ and transmit beamforming gain $A_t$, obtaining the detection probability $P_d$ of the mobile ISAC base station to the corresponding user:

$$P_d = Pr\left( |x|^2 > \varepsilon | \mathcal{H}_1 \right) = 1 - F_{\chi_2^2}\left( \frac{2\varepsilon / (N_r \sigma_m^2)}{1 + \mathcal{P}_{sm} \xi_m^2 A_r^2 A_t^2 / N_r \sigma_m^2} \right)$$

where $F_{\chi_2^2}(\cdot)$ represents the cumulative distribution function of the chi-square distribution with 2 degrees of freedom.

7. The method as claimed in claim 6, wherein in the step (4c), the performing equivalent transformation on the multi-user optimization problem, comprises:

obtaining the following relational expressions based on the total expanded effective capacity $$C_{P_d}(\theta_1, \ldots, \theta_M) = \sum_{m=1}^{M} C_{P_{dm}}(\theta_m)$$

of the M users, the detection probability $P_{dm}$ of the m-th user, a prior existence probability $H_{1m}$ of the m-th user, a false alarm rate $P_{fm}$ of the m-th user, a prior non-existence probability $H_{0m}$ of the m-th user, and a boundedness of $C_{P_d}(\theta_1, \ldots, \theta_M)$ determined by an effective capacity theoretical property:

$$0 \le C_{min}(\theta_1, \ldots, \theta_M) \le C_{P_d}(\theta_1, \ldots, \theta_M) \le C_{max}(\theta_1, \ldots, \theta_M)$$

$$\text{where } C_{min}(\theta_1, \ldots, \theta_M) = -\frac{1}{\theta_{max}}\log\left(\mathbb{E}\left[\prod_{m=1}^{M} A_m e^{-\sum_{m=1}^{M}\theta_m log(1+\gamma_m)}\right]\right)$$

represents a lower limit of $$C_{P_d}(\theta_1, \ldots, \theta_M),$$

$$C_{max}(\theta_1, \ldots, \theta_M) = -\frac{1}{\theta_{min}}\log\left(\mathbb{E}\left[\prod_{m=1}^{M} A_m e^{-\sum_{m=1}^{M}\theta_m log(1+\gamma_m)}\right]\right)$$

represents an upper limit of $C_{P_d}(\theta_1, \ldots, \theta_M)$, $A_m = P_{dm}H_{1m} + P_{fm}H_{0m}$ represents a total probability of base station sending information, $\gamma_m$ represents a SINR of the m-th user, $\theta_{max} = max(\theta_1, \theta_2, \theta_m, \ldots, \theta_M)$ represents a maximum value of $(\theta_1, \theta_2, \theta_m, \ldots, \theta_M)$, $\theta_{min} = min(\theta_1, \theta_2, \theta_m, \ldots, \theta_M)$ represents a minimum value of $(\theta_1, \theta_2, \theta_m, \ldots, \theta_M)$, $\theta_m$ represents a communication latency index of the m-th user, and $\mathbb{E}$ represents solving an expected value;

defining, based on the total probability of the base station sending information $A_m$, the communication latency index $\theta_m$ of the m-th user, and the SINR $\gamma_m$ of the m-th user, an equivalent expanded effective capacity function $A(\alpha)$ as follows:

$$A(\alpha) \stackrel{\triangle}{=} -\frac{1}{\alpha}\log\left(\mathbb{E}\left[\prod_{m=1}^{M} A_m e^{-\sum_{m=1}^{M}\theta_m log(1+\gamma_m)}\right]\right)$$

obtaining, based on continuous property of $A(\alpha)$ on $\alpha \in [\theta_{min}, \theta_{max}]$, the following inequality:

$$\left| A(\theta_0) - C_{P_d}(\theta_1, \ldots, \theta_M) \right| \le \varrho$$

where $\theta_0$ is an only real number value obtained on $[\theta_{min}, \theta_{max}]$, and $\varrho$ is a positive real number tending towards 0;

making $\check{C}_{P_d}(\theta_1, \ldots, \theta_M) = A(\theta_0)$, based on continuity property of the function $A(\alpha)$, obtaining the following inequality:

$$\left| \check{C}_{P_d}(\theta_1, \ldots, \theta_M) - C_{P_d}(\theta_1, \ldots, \theta_M) \right| \le \varrho$$

obtaining, based on the inequality $|\check{C}_{P_d}(\theta_1, \ldots, \theta_M) - C_{P_d}(\theta_1, \ldots, \theta_M)| \le \varrho$, the following equivalent transformation for the total expanded effective capacity:

$$C_{P_d}(\theta_1, \ldots, \theta_M) =$$

$$\check{C}_{P_d}(\theta_1, \ldots, \theta_M) = -\frac{1}{\theta_0}\log\left(\mathbb{E}\left[\prod_{m=1}^{M} A_m e^{-\sum_{m=1}^{M}\theta_m log(1+\gamma_m)}\right]\right).$$

8. The method as claimed in claim 7, wherein in the step (4d), the solving, by using a convex optimization theory, the communication power $\mathcal{P}_{cm}$ allocated to the m-th user in a multi-user system, comprises:

rewriting, based on a reciprocal property of a logarithmic function, the multi-user optimization problem P1 as the following form P2:

$$P2: \min_{\mathcal{P}_c} -\frac{1}{\theta_0}\log\left(\mathbb{E}\left[\prod_{m=1}^{M} A_m e^{-\sum_{m=1}^{M}\theta_m log(1+\gamma_m)}\right]\right)$$

$$\text{s.t. } \mathcal{P}_{cm} \ge 0, 0 \le m \le M$$

$$P_{dm} \ge \eta_m, m = 1,2, \ldots, M$$

$$\mathcal{P} \ge \sum_{m=1}^{M}\mathcal{P}_{cm} + \sum_{m=1}^{M}\mathcal{P}_{sm}$$

where $\theta_{min} \le \theta_0 \le \theta_{max}$, $\theta_{max}$ represents the maximum value of $(\theta_1, \theta_2, \theta_m \ldots, \theta_M)$, $\theta_{min}$ represents the minimum value of $(\theta_1, \theta_2, \theta_m, \ldots, \theta_M)$, $\mathbb{E}$ represents solving an excepted value, $\theta_m$ represents the communication latency index of the m-th user, $\gamma_m$ represents the SINR of the m-th user, $\mathcal{P}_{cm}$ represents the communication power of the m-th user, $\mathcal{P}_{sm}$ represents the sensing power of the m-th user, $P_{dm}$ represents the detection probability of the m-th user, $\eta_m$ represents the lower limit of the detection probability for the m-th user, and $\mathcal{P}$ represents the total power of the M users;

transforming, based on monotonicity of a log function, the optimization problem P2 into the following form P3:

$$P3: \min_{\mathcal{P}_c} \mathbb{E}\left[\prod_{m=1}^{M} A_m e^{-\sum_{m=1}^{M}\theta_m log(1+\gamma_m)}\right] =$$

$$\min_{\mathcal{P}_c}\prod_{m=1}^{M} A_m \int_0^\infty \prod_{m=1}^{M}(1+\gamma_m)^{-\beta_m} f_{|h|}(x)dx$$

$$\text{s.t. } \mathcal{P}_{cm} \ge 0, 0 \le m \le M$$

$$P_{dm} \ge \eta_m, m = 1,2, \ldots, M$$

$$\mathcal{P} \ge \sum_{m=1}^{M}\mathcal{P}_{cm} + \sum_{m=1}^{M}\mathcal{P}_{sm}$$

$$\text{where } \beta_m = -\frac{\theta_m}{\ln 2},$$

and $f_{|h|}(x)$ represents a probability density distribution followed by channel amplitude response between the mobile ISAC base station and the m-th user;

based on convexity of the optimization problem P3 on a spanning space $(\mathcal{P}_{c1}, \ldots, \mathcal{P}_{cM})$, constructing the following Lagrange equation $\mathcal{L}$:

$$\mathcal{L} = \prod_{m=1}^{M} A_m \int_0^\infty \prod_{m=1}^{M}(1+\gamma_m)^{-\beta_m} f_{|h|}(x)dx + \lambda_m\left(\mathcal{P} - \sum_{m=1}^{M}\mathcal{P}_{cm} - \sum_{m=1}^{M}\mathcal{P}_{sm}\right)$$

where $\lambda_m$ represents a Lagrange multiplier related to inequality constraints;

making partial derivative of the Lagrange equation $\mathcal{L}$ to $\mathcal{P}_{cm}$ be equal to 0, and obtaining the following equation:

$$\frac{\partial \mathcal{L}}{\partial P_{cm}} = -\beta_m \|h_m^T\|^2\left(1 + \frac{\mathcal{P}_{cm}\|h_m^T\|^2}{\sum_{i \ne m}^{M}\mathcal{P}_{ci}\|h_m^T\|^2 + \sigma_c^2}\right)^{-1} \times$$

$$\prod_{m=1}^{M}\left(\frac{\mathcal{P}_{cm}\|h_m^T\|^2}{\sum_{i \ne m}^{M}\mathcal{P}_{ci}\|h_m^T\|^2 + \sigma_c^2}\right)^{-\beta_m} f_{|h|}(x) - \lambda_m f_{|h|}(x) = 0$$

based on the equation of $$
\frac{\partial \mathcal{L}}{\partial P_{cm}} = -\beta_m \left\| h_m^T \right\|^2 \left( 1 + \frac{\mathcal{P}_{cm} \left\| h_m^T \right\|^2}{\sum_{i \neq m}^{M} \mathcal{P}_{ci} \left\| h_m^T \right\|^2 + \sigma_c^2} \right)^{-1} \times
$$

$$
\prod_{m=1}^{M} \left( \frac{\mathcal{P}_{cm} \left\| h_m^T \right\|^2}{\sum_{i \neq m}^{M} \mathcal{P}_{ci} \left\| h_m^T \right\|^2 + \sigma_c^2} \right)^{-\beta_m} f_{|h|}(x) - \lambda_m f_{|h|}(x) = 0,
$$

solving the communication power allocated by the multi-user system to the m-th user as follows:

$$
\mathcal{P}_{cm} = \frac{\sum_{i \neq m}^{M} \mathcal{P}_{ci} \left\| h_m^T \right\|^2 + \sigma_c^2}{\left\| h_m^T \right\|^2} \times \frac{\left( \prod_{m=1}^{M} \lambda_m \right)^{\frac{\beta_m M}{M \beta_m + 1}}}{\frac{\lambda_m}{\beta_m \left\| h_m^T \right\|^2} \prod_{m=1}^{M} \left( \beta_m \left\| h_m^T \right\|^2 \right)^{\frac{\beta_m}{M \beta_m + 1}}}
$$

where $\left\| h_m^T \right\|^2$ represents 2 norm of Nakagami-m channel gain of the m-th user, and M represents a total number of the users in the multi-user system.

\*　　\*　　\*　　\*　　\*